United States Patent [19]

Maruyama

[11] Patent Number: 6,055,381
[45] Date of Patent: *Apr. 25, 2000

[54] SILVER FILM CAMERA CAPABLE OF DISPLAYING AN ELECTRONICALLY PICKED-UP IMAGE

[75] Inventor: Atsushi Maruyama, Sagamihara, Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/953,487

[22] Filed: Oct. 17, 1997

[30] Foreign Application Priority Data

Nov. 21, 1996 [JP] Japan ................................. 8-311031

[51] Int. Cl.⁷ ...................................................... G03B 7/24
[52] U.S. Cl. ......................... 396/207; 396/210; 396/319; 396/374; 396/429; 348/333; 348/334
[58] Field of Search .................................... 396/207, 208, 396/210, 319, 374, 429, 373; 348/333, 334

[56] References Cited

U.S. PATENT DOCUMENTS

| 5,710,954 | 1/1998 | Inoue | 396/374 |
| 5,737,062 | 4/1998 | Yoshikawa | 396/319 |
| 5,774,750 | 6/1998 | Honda | 396/159 |
| 5,774,754 | 6/1998 | Ootsuka | 396/380 |
| 5,822,625 | 10/1998 | Leidig et al. | 396/429 |

FOREIGN PATENT DOCUMENTS 1-114169  5/1989  Japan.

Primary Examiner—Russell Adams
Attorney, Agent, or Firm—Pillsbury Madison & Sutro LLP

[57] ABSTRACT

A camera for exposing a silver film to an image of an object uses a sensor to convert an object of the image into an image signal. The image signal is then stored in connection with an identification code of the film. The stored image signal is read out in accordance with the identification code of the film and a corresponding frame number, and an object image can be displayed on a monitor on the basis of the read-out image signal. A photographer can alter data recorded on a magnetic recording medium while watching the display on the monitor.

16 Claims, 7 Drawing Sheets

SILVER FILM CAMERA CAPABLE OF DISPLAYING AN ELECTRONICALLY PICKED-UP IMAGE

BACKGROUND OF THE INVENTION

FIELD OF THE INVENTION

This invention relates to a silver film camera which has a function of an electronic imaging device having an electronic image pick-up device for converting an object image into an electrical signal, and a function of a silver film photographing device for forming an object image on a silver film, and in which the object image picked up by the electronic imaging device can be displayed.

Conventionally, a camera for both silver film photographing and electronic imaging has been known. The camera exposes a silver film to an object image, and at the same time stores in a memory the object image which has been photoelectrically converted by the electronic image pick-up device. For example, Japanese Laid-Open Patent Application Publication No. Hei 1-114169 discloses a single-lens reflex camera in which a part of an light beam transmitted from an object through an optical system is reflected by a half mirror to form an image of the object on an image pick-up device while the other part of the object light beam is transmitted through the half mirror to form an image of the object on a film. The image pick-up device converts the formed image into an image signal. A display device uses the image signal to display the object image, so that the image formed on the film can be confirmed.

In addition, recently there is on the market a camera which can be loaded with a film coated with a magnetic material in order to record various kinds of information. The magnetically recorded information includes a photographing date, a number of prints, and the like. The number of prints is set by a user after or before a photographing operation.

However, this camera has the following problems: If the number of prints is set after the photographing, the photographer has to remember the photographed scene. If the number of prints is set before the photographing, the composition and shutter timing of the resultant photograph may possibly be different from those intended by the photographer.

Under the circumstances, setting the number of prints is a function which is difficult for the photographer to use.

Thus, one thinks of using the technique disclosed in Japanese Laid-Open Patent Application Publication No. Hei 1-114169 so as to watch the display device immediately after a photographing, decide whether the photographed image is appropriate, and then set a number of prints. However, if the number of prints of a certain frame is set after a frame next to the certain frame has been photographed, it is necessary to rely upon the memory of the photographer, because the image of the certain frame cannot be confirmed on the display device.

Further, when setting the numbers of prints for a developed film, the user refers to an index print (print of a series of photographs taken on a roll of film) to instruct a processing laboratory to make desired numbers of prints. However, the user must always store both of the film and the index print, keeping their correspondence, thus their management is troublesome.

SUMMARY OF THE INVENTION

An object of this invention is to provide a camera for exposing a silver film to an object image and converting an object image into an image signal by an electronic image pick-up device in order to record the object image.

Another object of this invention is to provide a camera in which an object image is converted into an image signal by an electronic image pick-up device, in which the image signal is stored in a memory, and in which an image signal of an object image corresponding to an exposed frame is read out.

A further object of this invention is to provide a camera which has a function of an electronic imaging device having an electronic image pick-up device for converting an object image into an electrical signal, and a function of a silver film photographing device for forming an object image on a silver film, and in which a number of prints can be easily set either before or after a photographing operation so that the management of the film is easy.

In a first aspect of this invention, a camera for use with a silver film comprises an electronic imaging device having an electronic image pick-up device for converting an object image into an image signal. A monitor displays an object image on the basis of the image signal. A storage medium stores the image signal. The camera further comprises a silver film photographing device for exposing the silver film to an object image. A reading device reads an identification code of the silver film loaded in the silver film photographing device. A display controller controls the reading device to read the identification code when the silver film is loaded in the silver film photographing device. The display controller also retrieves an image signal stored in the storage medium and corresponding to the read identification code and controls the monitor to display an object image on the basis of the retrieved image signal.

In a second aspect of this invention, a camera for use with a silver film comprises an electronic imaging device having an electronic image pick-up device for converting an object image into an image signal. A monitor displays an object image on the basis of the image signal. A storage medium stores electronic image data based on the image signal. The camera further comprises a silver film photographing device for exposing the silver film to an object image. A writing device writes a film identification code on the silver film loaded in the silver film photographing device. A writing control means controls the writing device to write the film identification code if the film loaded in the silver film photographing device is an unexposed film. A storage control means stores, in connection with the identification code, the electronic image data in the storage medium.

In a third aspect of this invention, a camera for use with a silver film comprises an electronic imaging device having an electronic image pick-up device for converting an object image into an image signal. A monitor displays an object image on the basis of the image signal. A storage medium stores electronic image data based on the image signal. The camera further comprises a silver film photographing device for exposing the silver film to an object image. A reading device reads an identification code of the silver film loaded in the silver film photographing device. An information setting member sets laboratory information to be utilized by a processing laboratory for printing. A laboratory information displaying device displays the laboratory information. An information recording device records the laboratory information on the silver film. A controller controls the reading device to read the identification code when the silver film is loaded in the silver film photographing device. The controller also retrieves electronic image data stored in the storage medium and corresponding to the read identification code, controls the monitor to display, on the basis of the retrieved electronic image data, an object image together with the laboratory information, and controls the information recording device to record the laboratory information on the silver film.

In a fourth aspect of this invention, a camera for use with a silver film comprises means for exposing the silver film to an object image; means for converting an object image into an electric signal; and a monitor for displaying an object image on the basis of the electric signal. The camera further comprises a storage medium for storing the electrical signal; a reading device for reading an identification data corresponding to the silver film; and a display controller for reading out an electric signal stored in the storage medium and corresponding to the identification data and for controlling the monitor to display an object image on the basis of the read-out electric signal.

DETAILED DESCRIPTION OF THE PREFERRED EMBODIMENTS

Figure 1:
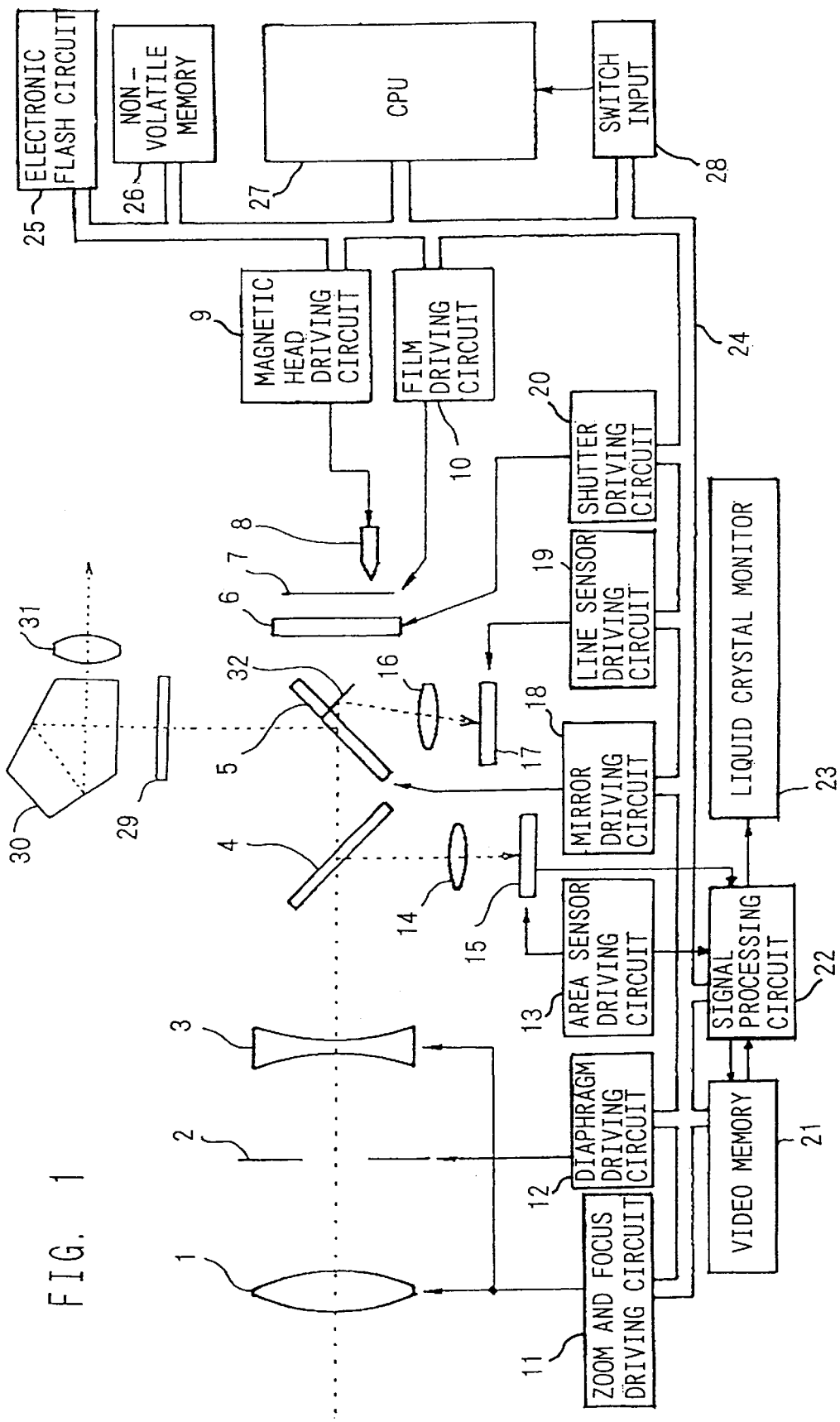
FIG. 1 is a block diagram of a camera of an embodiment of this invention.

Reference will now be made in detail to the presently preferred embodiments of the invention as illustrated in the accompanying drawings, in which like reference characters designate like or corresponding parts throughout the several drawings.

FIG. 1 is a block diagram of a camera of an embodiment of this invention. A photographing lens for forming an object image comprises a convex lens 1 and a concave lens 3. A diaphragm mechanism 2 is positioned inside the photographing lens. A diaphragm driving circuit 12 controls the driving of the diaphragm mechanism 2. A half mirror 4 is provided behind the concave lens 3. A part of the light from the object image is reflected by the half mirror 4 to form an image on an area sensor 15 through an image formation lens system 14.

The area sensor 15 is controlled by an area sensor driving circuit 13 to convert the formed object image into an analog image signal. The analog image signal is outputted to a signal processing circuit 22. The signal processing circuit 22 executes predetermined signal processings including a conversion of the analog image signal to a digital image signal. The signal processing circuit 22 is connected to a video memory 21 and a liquid crystal monitor (LCD monitor) 23.

The signal processing circuit 22 is also connected to a non-volatile memory 26 and the like via a data bus 24.

The signal processing circuit 22 transfers the processed digital image signal to the video memory 21 and the non-volatile memory 26. On the basis of the digital image signal stored in the video memory 21, an image is displayed on the liquid crystal monitor 23.

The non-volatile memory 26 is convenient as a storage medium for a digital image signal, because the stored signal is maintained even when the power of a camera body is turned off. If the non-volatile memory 26 is designed to be attachable with respect to the camera body, the memory can easily be replaced when the capacity of the memory is exhausted. If a backup power source is provided, the non-volatile memory 26 can be replaced with a volatile memory. However, it is more convenient to use a non-volatile memory, because an image signal can be maintained even when the power of the camera is turned off. Further, it is convenient to use a non-volatile memory which is electrically rewritable, because rewriting can be made when the capacity of the memory is exhausted.

The brightness of the object is determined by utilizing the analog signal of the area sensor 15. For that purpose, the analog signal is digitized by the signal processing circuit 22 and is transferred to a central processing unit (CPU) 27 via the data bus 24.

A movable mirror 5 is arranged behind the half mirror 4. The central portion of the movable mirror 5 is a half mirror. A sub-mirror 32 is provided at the center of the rear side of the movable mirror 5, so as to reflect the object light downward.

A separator optical system 16 for image separation is positioned in the direction of the optical axis reflected by the sub-mirror 32. The separator optical system 16 comprises two lenses arranged in a direction perpendicular to the drawing. A line sensor 17 is located at a position where an image of the object is formed by the separator optical system 16. The line sensor 17 is connected to a line sensor driving circuit 19. The sub-mirror 32, the separator optical system 16, the line sensor 17, and the like form a focus detecting device based on the known phase difference method. The CPU 27 determines a difference between two images on the basis of signals inputted via the line sensor driving circuit 19, and calculates the amount of driving the photographing lens to an in-focus position.

The lenses 1 and 3 of the photographing lens are provided with a zoom and focus driving circuit 11 for controlling driving sources for a zooming operation and a focusing operation. The zoom and focus driving circuit 11 has encoders (not shown) for generating signals in response to the movement of the respective lenses. The CPU 27 performs a focusing operation on the basis of the calculated amount of driving and the outputs of the encoders.

A focusing screen 29, a pentagonal prism 30, and a finder eyepiece optical system 31 are positioned on the optical path reflected by the movable mirror 5. The reason why the optical finder is provided as a monitor of an object image in addition to the LCD monitor 23 is as follows: when the photographer looks through the optical finder instead of watching the LCD monitor 23, he can hold the camera steadily so that a camera shake will less occurs.

A mirror driving circuit 18 drives the movable mirror 5. A shutter driving circuit 20 drives a shutter 6. The movable mirror 5 is in a down position during an observation for determining a composition. When a two-stroke type release button 38 (see FIG. 4) for starting an exposure operation is pushed completely with two strokes, the movable mirror 5 rises to an up position, the shutter 6 is opened to form an object image on a silver film 7. Based on a subject brightness value derived from the signal processing circuit 22 and a film speed detected by a film speed detecting circuit (not shown), the CPU 27 calculates an aperture value of an aperture 2 and a shutter speed for a correct exposure. The shutter 6 is driven at the calculated shutter speed.

A magnetic recording layer is formed on the silver film 7. A magnetic head 8 is positioned so as to touch the magnetic recording layer. The magnetic head 8 has functions of magnetically recording various kinds of information and of reading information magnetically recorded on the film. A magnetic head driving circuit 9 controls the writing and the reading.

A film driving circuit 10 is provided in the camera body and controls all film feeding operations: an initial winding-up operation for accessing the first frame of the film 7 loaded in the camera, a winding-up operation of the film 7 when one frame has been exposed, and a rewinding operation for rewinding the film 7 when all of the frames of the film 7 have been exposed or when a button (not shown) for forced rewinding of the film has been operated.

The magnetic head 8 magnetically records during these feeding operations.

The camera is provided with an electronic flash circuit 25 for illuminating the object. The flash circuit 25 operates as an auxiliary light when the CPU 27 decides that the object brightness is lower than a predetermined brightness. The switch input 28 comprises a plurality of switches, such as the release button 38, operation switches (a zoom-in-and-out operation button 34, a dial 41, and push buttons 41–44 shown in FIG. 4, and the like), and a switch (not shown) for detecting an operation of a mechanism.

The data bus 24 connects the signal processing circuit 22, the electronic flash circuit 25, the non-volatile memory 26, the video memory 21, the CPU 27, the magnetic head driving circuit 9, the film driving circuit 10, the shutter driving circuit 20, the line sensor driving circuit 19, the mirror driving circuit 18, the diaphragm driving circuit 12, and the zoom and focus driving circuit 11, whereby the data are exchanged. The CPU 27 controls the operations of these circuits and components.

Next, referring to a flowchart shown in FIG. 2, the operations of the camera of the present invention at the time of film loading will be described. When a film cartridge is loaded in the camera, a film loading subroutine is called from a main routine (not shown). In step S1, it is decided whether a lid of a film cartridge receiving chamber has been closed. If it has been closed, a bar code provided to the cartridge is read in step S2. The bar code shows an ISO speed and an exposure state of the film. The exposure state of the film is an unexposed state, an exposed state, a partially exposed state, or a developed state. In the exposure state, the film is completely unexposed. In the exposed state, all of the frames of the film have been exposed. In the partially exposed state, only some frames have been exposed. In the developed state, the film has already been developed in a processing laboratory.

Next, in step S3, a film feeding is started and a control operation is executed in accordance with the exposure state of the film. In step S4, it is decided whether the film is in the developed state or the exposed state. If the film is either in the developed state or the exposed state, the process proceeds to step S5 to read an identification code of the film which is magnetically recorded on a film reader portion (not shown). In step S6, the film is fed to access the first frame, and in step S10, the film feeding is stopped. In step S15, the procedure returns to the main routine (not shown). Since the film is in the developed state or the exposed state, no photograph will be taken on the film. Therefore, the film feeding may be stopped or the film may be rewound after the identification code of the film has been read.

The identification code is a code for enabling the camera to identify the film cartridge loaded in the camera, and is magnetically recorded on the film leader portion (not shown) when the film cartridge is loaded in the camera for the first time. The identification code is formed on the basis of, for example, an identification data of the camera and a date, and is unique to the cartridge. If a film manufacturer has applied an identification code to a cartridge in advance, for example, if a bar code is applied to the side surface of the cartridge, or a manufacturing number is recorded on the magnetic recording portion of the film in the cartridge, these may be used.

If it is decides in step S4 that the film is neither in the developed state nor in the exposed state, the process proceeds to step S7 to decide whether the film is in the partially exposed state. If the film is in the partially exposed state, the process proceeds to step S8 to read the identification code magnetically recorded on the film leader portion (not shown). In step S9, the film is fed to access the first unexposed frame. The process then proceeds to step S10 to stop the film feeding. As described above, in steps S5 and S8, the identification code can be read when the film is loaded, so that an image corresponding to the identification code can immediately be displayed.

If the film is decided not to be partially exposed in step S7, it is decided in step 11 whether the film is unexposed. If the film is unexposed, the process proceeds to step S12, in which the identification code of the film is magnetically recorded on the film leader portion (not shown). In step S13, the film is fed to access the first frame, and the process proceeds to step S10. If the film is decided not to be unexposed in step S11, the film is not in any of the exposure states. Therefore, the film is decided to be abnormal, and a predetermined abnormal process is executed in step S14.

If the film is decided to be unexposed in step S11, the identification code is only recorded and not read. This is because in this case no image signals corresponding to the identification code have been stored in the non-volatile memory 26, thus the reading operation is unnecessary.

Figure 3:
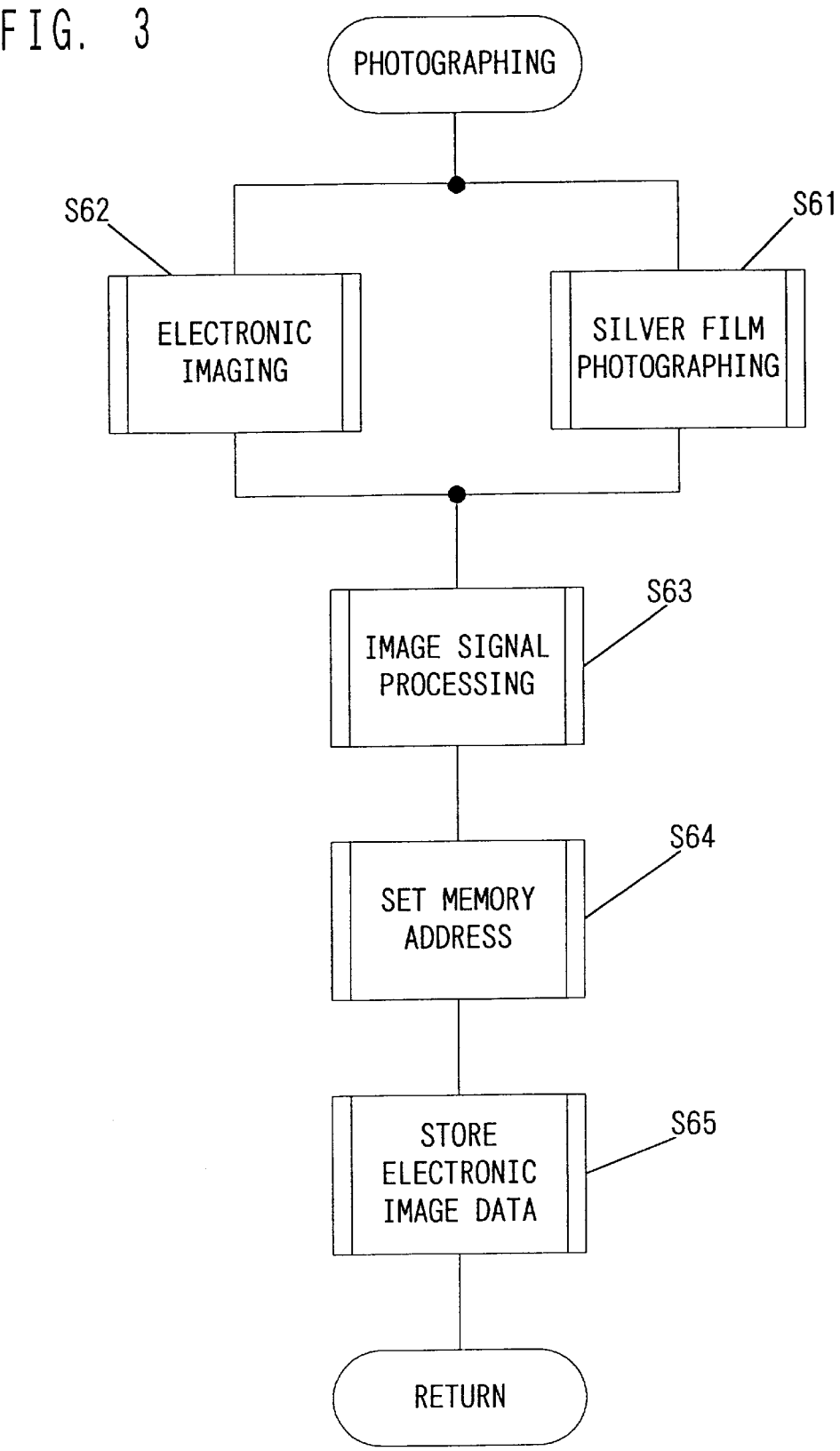
FIG. 3 is a flowchart of a photographing sequence of the camera shown in FIG. 1.

Next, FIG. 3 shows a photographing sequence of this embodiment. The sequence is executed in response to a release switch (not shown) being turned on.

A silver film photographing and an electronic imaging are executed in parallel in steps S61 and S62. In the silver film photographing, after the aperture of the diaphragm 2 is reduced, the shutter 6 is opened and the silver film 7 is exposed to an object image. In the electronic imaging, while the silver film 7 is being exposed to the object image, an image signal from the area sensor 15 is read out. In step S63, electronic image data compression and the like processing are executed.

Then, in step S64, a first address for storing the electronic image data in the non-volatile memory 26 is set on the basis of the identification code of the film cartridge and the frame number of the film. Instep S65, the electronic image data is stored in accordance with the set address. Therefore, in order to display on the LCD monitor 23 an electronic image corresponding to a specific frame of an exposed film after loading the film in the camera, it is sufficient to retrieve the address of the non-volatile memory 26 based on the identification code of the film cartridge and the number of the frame desired to be displayed.

Figure 4:
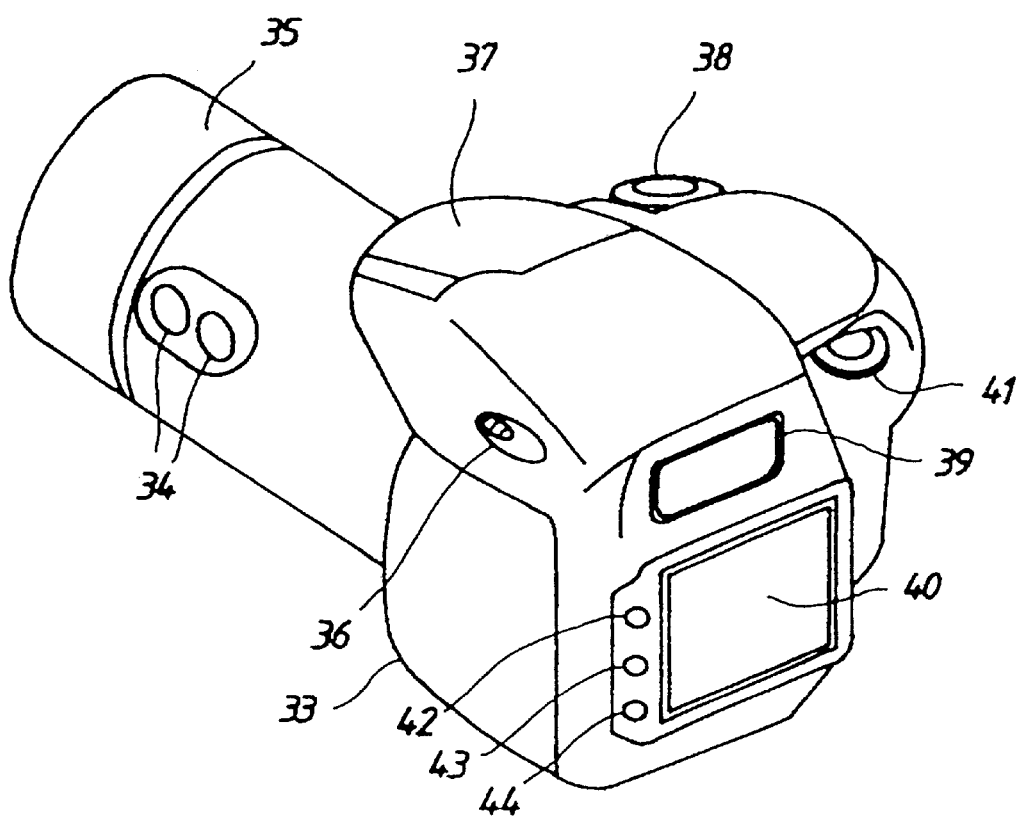
FIG. 4 is a perspective view of the camera shown in FIG. 1.

FIG. 4 is a perspective view of the camera in accordance with this invention. A photographing lens barrel 35 includes the convex lens 1, the concave lens 3, and the diaphragm 2. The camera is provided with the zoom-in-and-out operation button 34, an electronic flash 37, the two-stroke type release button 38, a power switch 36, and a color LCD panel 40 (corresponding to the LCD monitor 23 in FIG. 1) for monitoring an electronic image picked up by the electronic imaging device including the area sensor 17. The push buttons 42, 43, and 44, and the dial 41 are operation members for selecting an image or setting information in accordance with the present invention.

Figures 5A, 5B, 5C:
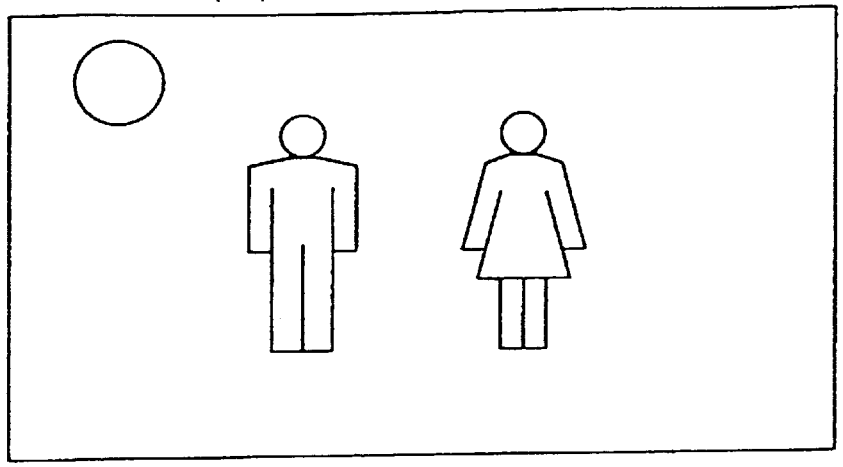
FIG. 5(A) is an illustration of an image displayed on an LCD panel of the camera shown in FIG. 1 when a developed film is loaded.
FIG. 5(B) is an illustration of information which can be set by a photographer.
FIG. 5(C) is an illustration of the image shown in FIG. 5(A) overlapped with the information shown in FIG. 5(B).

FIGS. 5(A), 5(B), and 5(C) show an example of display on the LCD panel 40 when a developed film is loaded in the camera. These figures will be explained together with the operations of the operation members of FIG. 4.

Figure 2:
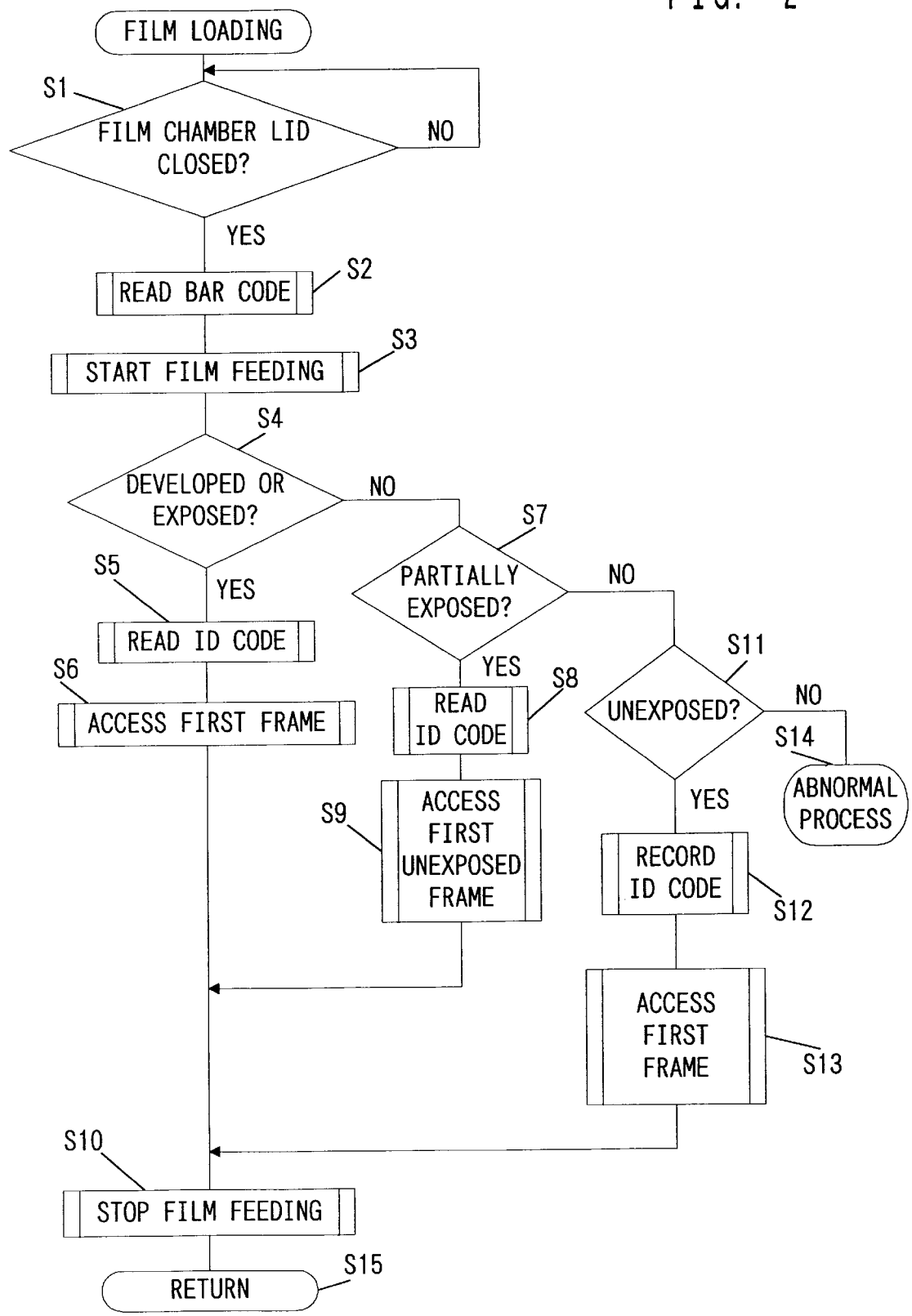
FIG. 2 is a flowchart of operations of the camera shown in FIG. 1 when a film is loaded.

When a developed or exposed film is loaded in the camera, an identification code of the film is read, as described with respect to FIG. 2. Then, the digital image signal of the first frame corresponding to the identification code, and the information previously set are read out from the non-volatile memory 26 to display the image of the first frame and the information. If no previously set information exists, predetermined initial data are displayed. If the dial 41 is operated at this time, an image corresponding to an arbitrary frame is selectively displayed.

FIG. 5(A) shows the image corresponding to the first frame of the film. FIG. 5(B) illustrates the information which can be set by the photographer. FIG. 5(C) is an illustration of the image shown in FIG. 5(A) overlapped with the information shown in FIG. 5(B). Thus, the image displayed on the LCD panel 40 is such as shown in FIG. 5(C). FLAME NO., TITLE, LANGUAGE, and COLOR represent the frame number, the number of prints, the title of the frame, the language of the title, and the information on color correction, respectively, which can be set by the photographer. DATE is the date of photographing of the frame. In the example of FIG. 5, the frame number is 1, the number of prints is 0, and the title, language, and color correction are not designated. The date of photographing is Nov. 1, 1996.

Thus, the object image and the data to be recorded corresponding to the object image are simultaneously displayed on the LCD panel 40. This is convenient for the photographer, because he can check the object image and the recorded data simultaneously.

Next, a procedure for setting the information is described. The button 42 is an operation button for turning on and off a data input mode. When the button 42 is operated to turn on the data input mode, it is possible to select one of the setting items: the frame number, the number of prints, the title of the frame, the language of the title, and the information on color correction, and to select the contents of the items. Each time the button 43 is pushed, the setting items scroll in order and the photographer selects a desired item to be set.

Next, when the dial 41 is rotated, the contents of the setting items can be selected. For example, the number of prints may be 0, 1, 2, 3, or 5. The title may be in blank, or "congratulations," "entrance ceremony," or "wedding ceremony." The language may be in blank, or "Japanese," "English," or "German." The color correction may be in blank, or such as, "red", "green", or "blue". The color correction is to designate which of red, green, and blue should be accentuated in the finished print. When the information setting has been finished and the button 44 for finishing the setting has been pushed, the information set for the respective frames is magnetically recorded on the corresponding frames. Then the film is rewound and the data input mode is cancelled.

The set information is also stored in the non-volatile memory 26.

When the film with the above-described information magnetically recorded is handed to a processing laboratory, the set numbers of prints for the respective frames will be produced with the designated color corrections made and with the titles printed in the designated languages. In the above description, the film loaded in the camera is assumed to be a developed or exposed film. If a partially exposed film is loaded in the camera, only the images corresponding to the exposed frames are displayed and their information is set. If an unexposed film is loaded, the information setting is prohibited, because no digital image signals corresponding to the film exist.

Figure 6:
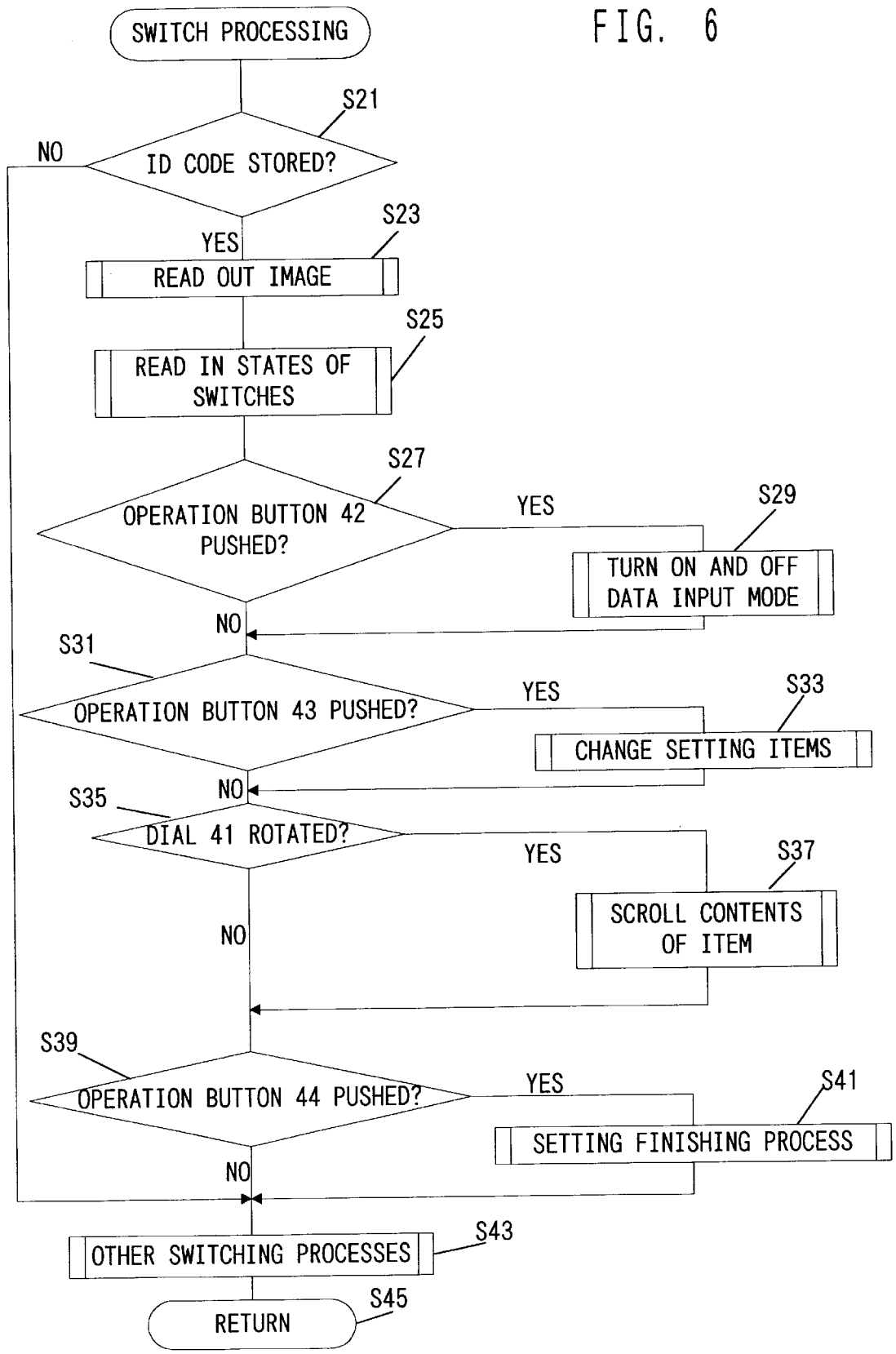
FIG. 6 is a flowchart of processing in response to switch operations in the camera shown in FIG. 1.

FIG. 6 is a flowchart for processing in response to the operations of the above-described operation members.

A switch processing subroutine is called from the main routine (not shown). In step S21, it is decided whether the identification code read in step S5 of FIG. 2 has been stored in the non-volatile memory 26. If the identification code is stored, the process proceeds to step S23 to call a subroutine for reading out an image. On the other hand, if the identification code is not stored, the process proceeds to step S43. In this case, before proceeding to step S43, it may be displayed on the LCD monitor 40 that the identification code has not been stored.

Figure 7:
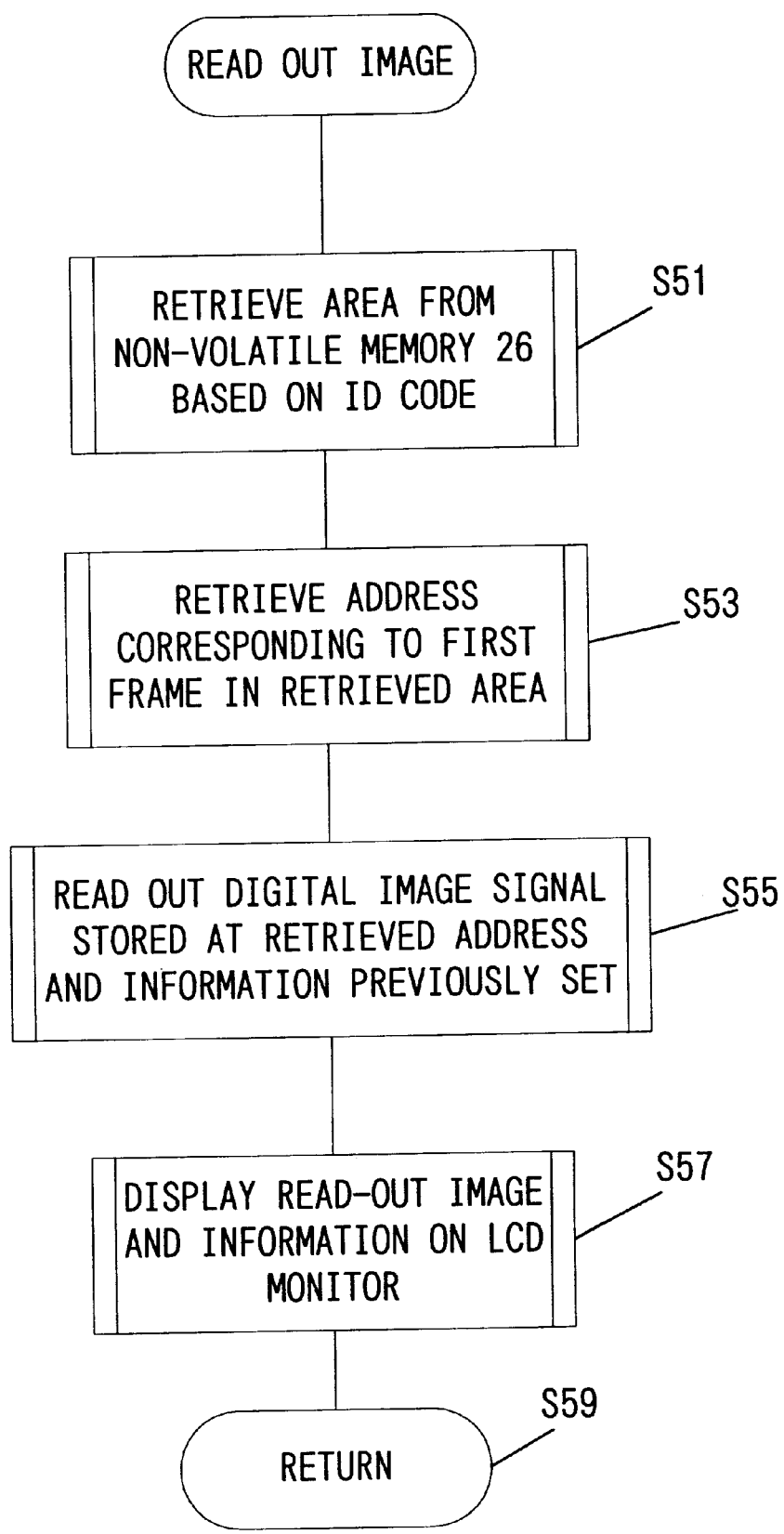
FIG. 7 is a flowchart of a subroutine for reading out an image in the camera shown in FIG. 1.

The image reading-out subroutine in step S23 is shown in FIG. 7. In step S51, based on the identification code read, the area in which the digital image signals corresponding to the film loaded in the camera are stored is retrieved from the non-volatile memory 26, and the area is designated. In step S53, the address corresponding to the first frame is retrieved in the retrieved area. In step S55, the digital image signal stored at the address and the information set in relation to the digital image signal are read out. In step S57, the read-out image and information are displayed on the LCD monitor 23. Instep S59, the process returns to the routine shown in FIG. 6. In this flowchart, since the first frame is accessed (see step S6 in FIG. 2), the image corresponding to the first frame is automatically read out at first. Then, an image corresponding to a frame designated by the dial 41 can be read out. Further, instead of automatically reading out the image of the first frame as in this flowchart, it is also possible to arbitrarily designate a frame by the dial 41 to read out the image of the designated frame.

Returning to the flowchart of FIG. 6, in step S25, the states of the operation buttons 42, 43, and 44, the dial 41, and other switches (not shown) are read in. In step 27, it is decided whether the operation button 42 has been pushed. If the button 42 has been pushed, the data input mode is turned on in step S29, so that the above-described setting items and the contents of the respective setting items can be selected. If the operation button 42 is pushed again during the data input mode, the data input mode is cancelled.

Next, in step S31, it is decided whether the operation button 43 has been pushed. If the button 43 has been pushed, the setting items, such as the number of prints and the title of the frame, are changed in step S33. In step 35, it is decided whether the dial 41 has been rotated. If the dial 41 has been rotated, the contents of the item are scrolled in accordance with the amount of rotation in step S37. For example, if the number of prints is set, the number is changed. In step S39, it is decided whether the operation button 44 has been pushed. If it has been pushed, the information set is magnetically recorded on the corresponding frame, and a setting finishing process, such as the rewinding of the film, is executed in step S41. In step S43, other switching processes are executed, and the procedure returns in step S45.

Thus, in the embodiment of this invention, various kinds of information can be written on the magnetic recording medium of the film while checking the photographed object image, and the processing laboratory can make subsequent treatment on the basis of the written data, which is very convenient. Particularly, in this embodiment, various kinds of information, such as the number of prints, can easily be set after photographing whether the film is partially exposed, exposed, or developed, and the management of the film will be easy.

What is claimed is:

1. A camera for use with a silver film contained in a film cartridge and having an identification code, comprising:

an electronic imaging device having an electronic image pick-up device for converting an object image into an image signal;

a monitor for displaying an object image on the basis of the image signal;

a storage medium for storing the image signal;

a silver film photographing device for exposing the silver film to an object image;

a reading device for reading said identification code of the silver film loaded in the silver film photographing device, said identification code being unique to said film cartridge; and a display controller for controlling the reading device to read the identification code when the silver film is loaded in the silver film photographing device, for retrieving an image signal stored in the storage medium corresponding to the read identification code, and for controlling the monitor to display an object image on the basis of the retrieved image signal.

2. The camera according to claim 1, wherein the storage medium is an electrically rewritable non-volatile memory.

3. The camera according to claim 1, wherein the display controller decides whether the silver film is an unexposed film, and prohibits retrieval of the image signal if the silver film is unexposed.

4. The camera according to claim 1, wherein the identification code read by the reading device is recorded in a leader portion of the film.

5. The camera according to claim 1, further comprising a data writing apparatus for writing data on the film, wherein the monitor displays the data written by the data writing apparatus.

6. The camera according to claim 5, wherein the monitor displays the object image on the basis of the image signal stored in the storage medium, and the data corresponding to the object image and stored in the storage medium, the object image and the data overlapping with each other.

7. The camera according to claim 5, wherein the data is at least one of a number of prints, a title, a language of the title, and color correction information.

8. A camera for use with a silver film capable of data recording and contained in a film cartridge, comprising:

an electronic imaging device having an electronic image pick-up device for converting an object image into an image signal;

a monitor for displaying an object image on the basis of the image signal;

a storage medium for storing electronic image data based on the image signal;

a silver film photographing device for exposing the silver film to an object image;

a writing device for writing a film identification code on the silver film loaded in the silver film photographing device, said film identification code being unique to said film cartridge;

writing control means for controlling the writing device to write the film identification code if the silver film loaded in the silver film photographing device is an unexposed film; and storage control means for storing, in connection with the identification code, the electronic image data in the storage medium.

9. The camera according to claim 8, wherein the writing device writes the identification code on a magnetic recording medium of the film.

10. The camera according to claim 8, wherein the writing device writes the identification code on a leader portion of the film.

11. A camera for use with a silver film contained in a film cartridge and having an identification code, comprising:

an electronic imaging device having an electronic image pick-up device for converting an object image into an image signal;

a monitor for displaying an object image on the basis of the image signal;

a storage medium for storing electronic image data based on the image signal;

a silver film photographing device for exposing the silver film to an object image;

a reading device for reading said identification code of the silver film loaded in the silver film photographing device, said identification code being unique to said film cartridge;

an information setting member for setting laboratory information to be utilized by a processing laboratory for printing;

a laboratory information displaying device for displaying the laboratory information;

an information recording device for recording the laboratory information on the silver film; and a controller for controlling the reading device to read the identification code when the silver film is loaded in the silver film photographing device, for retrieving electronic image data stored in the storage medium and corresponding to the read identification code, for controlling the monitor to display, on the basis of the retrieved electronic image data, an object image together with the laboratory information, and for controlling the information recording device to record the laboratory information on the silver film.

12. The camera according to claim 11, wherein the laboratory information is at least one of a number of prints, a title, a language of the title, and color correction information.

13. A camera for use with a silver film contained in a film cartridge and having an identification data, comprising:

means for exposing the silver film to an object image;

means for converting an object image into an electric signal;

a monitor for displaying an object image on the basis of the electric signal;

a storage medium for storing the electrical signal;

a reading device for reading said identification data corresponding to the silver film; said identification data discriminating each film cartridge; and a display controller for reading out an electric signal stored in the storage medium corresponding to the identification data and for controlling the monitor to display an object image on the basis of the read-out electric signal.

14. The camera according to claim 13, wherein the display controller controls the monitor to simultaneously display the object image and subsequent treatment information recorded on the film.

15. The camera according to claim 14, further comprising an altering device for altering the subsequent treatment information.

16. The camera according to claim 13, further comprising a recording device for recording identification data on the silver film if the silver film has not been developed.

* * * * *